Aug. 9, 1949.   W. J. O'BRIEN   2,478,833
AREA IDENTIFICATION SYSTEM
Filed June 3, 1946                                                  2 Sheets-Sheet 1

RECEIVER.

INVENTOR.
William J. O'Brien

Aug. 9, 1949.    W. J. O'BRIEN    2,478,833
AREA IDENTIFICATION SYSTEM
Filed June 3, 1946    2 Sheets-Sheet 2

INVENTOR.
William J O'Brien

Patented Aug. 9, 1949

2,478,833

UNITED STATES PATENT OFFICE 2,478,833

AREA IDENTIFICATION SYSTEM

William J. O'Brien, London, England, assignor to The Decca Record Company, Limited, London, England, a corporation of Great Britain Application June 3, 1946, Serial No. 673,951

9 Claims. (Cl. 343—105)

My invention relates to radio navigational systems and has particular reference to an area or lane identification system permitting one lane out of a relatively large number of lanes or sectors to be definitely identified.

In my copending application, Serial No. 612,987, filed August 27, 1945 and entitled "Navigation system," I have disclosed a radio frequency navigational aid which includes means for continuously apprising the operator of the vehicle equipped with suitable receiving apparatus of the geographical location of the vehicle. The system which is disclosed in that application depends for its operation upon a knowledge of the geographical location of the vehicle at the time the system is placed in operation to permit the coordinate indicators to be manually set to the known geographical location. Once properly set, the indicators will thereafter operate to indicate continuously the geographical location of the vehicle as it moves from place to place within the operational field covered by the navigational system.

Under certain circumstances it is difficult, if not impossible, for an operator of the vehicle to know his precise geographical location at the time the system is placed in operation or at the time he comes within the operating field of the system. If, for example, the system is of a relatively local type employed for aiding the navigation of vessels along a narrow or tortuous channel or is used to aid in the guiding and landing of aircraft at an air port, the vehicle will ordinarily approach the operating field of the system from the outside so that when the coordinate indicators within the vehicle begin to operate, the operator of the vehicle will be without precise knowledge of his then geographical location. Furthermore, even though the coordinate indicators may have been properly set at the time the system is placed in operation, service interruptions or difficulties with the transmitting or receiving equipment during operation for a period of time sufficient to allow the vehicle to proceed from one sector to another, will result in the loss of registration and give an erroneous location indication upon the resumption of service.

The present invention is directed to an improvement on the system disclosed in my aforementioned copending application and is intended to overcome the above noted disadvantages by providing for the positive identification of one lane or sector out of a relatively large number of lanes or sectors.

It is, therefore, an object of my invention to provide an area or lane identification system for use with radio frequency navigational systems and which operates from time to time to identify the area, sector or lane within which the vehicle is moving.

It is also an object of my invention to provide an identification system of the character set forth in the preceding paragraph in which a sector identification is provided by periodically subjecting the navigation system transmitting apparatus to an alternative mode of operation.

It is additionally an object of my invention to provide a system and apparatus of the character hereinbefore mentioned which includes a lane indicator in addition to the two coordinate indicators normally forming a part of the navigational aid.

It is a still further object of my invention to provide a lane identification system of the character set forth in the preceding paragraphs in which the alternative mode of transmitter operation is characterized by the employment of a minimum number of radiated frequencies.

Still another object of my invention is to provide a lane identification system of the character set forth hereinbefore in which a single lane identification indicator is used alternatively to identify one lane out of a relatively large group of lanes in each of a plurality of radio frequency navigational field patterns.

Other objects and advantages of my invention will become apparent from a study of the following specification, read in connection with the accompanying drawings, wherein.

Figure 1:
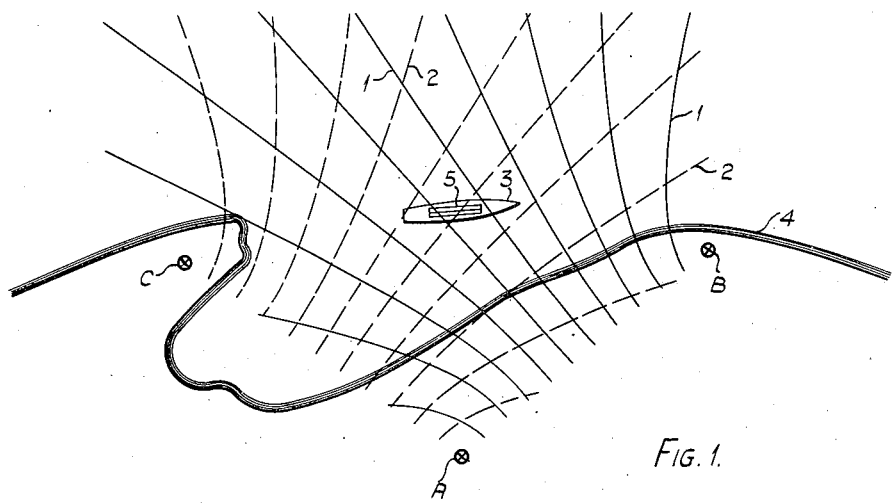
Fig. 1 is a diagram representing the transmitter locations and the hyperbolic coordinate systems produced by the normal operation of a navigational system such as that disclosed in my aforementioned copending application.

Referring to the drawings, I have illustrated in Fig. 1 a hyperbolic coordinate system such as is developed by normal operation of a navigational system such as is disclosed in my aforementioned copending application. Such a system includes a master transmitter A, on either side of which are positioned slave transmitters B and C. The slave transmitters B and C operate at frequencies which are different from each other and different from the frequency of the signals radiated by transmitter A. All of the frequencies, however, bear a fixed and known relation to each other, and the slave transmitters are phase locked to the master transmitter so that there exists as between the A and B radiations a fixed multiple phase relationship and so that a known fixed multiple phase relationship also exists as between the signals radiated from the transmitters A and C. Since the slave transmitters are phase locked to the master transmitter and since the transmitters are held in fixed geographical locations with respect to each other, there is developed by the interaction of the A and B signals a hyperbolic field pattern such as that represented by the solid lines 1 in Fig. 1, which lines represent the contours of equal multiple phase displacement of the B signals with respect to the A signals. The interaction of the signals from transmitters A and C produce a similar pattern, such as that represented by the dashed lines 2 in Fig. 1. In Fig. 1, the contour lines 1 and 2 are intended to represent the locus of all points along which an in-phase relation exists so that the phase change encountered in proceeding from one of the lines 1 to an adjacent line 1 or from one of the lines 2 to an adjacent line 2 is 360 electrical degrees.

If the navigational system is to be used for guiding the navigation of surface vessels such as, for example, the ship 3 shown in Fig. 1, the transmitters A, B and C are, by preference, located along or near the shoreline 4 and the vessel 3 will be equipped with suitable receiving apparatus including a receiving antenna represented at 5. With such an arrangement and employing apparatus of the character disclosed in my aforementioned copending application, there is provided for the operator of the vehicle or vessel 3 a continuous indication of the vehicle's location in terms of the equi-phase field coordinate system represented by the lines 1 and 2 in Fig. 1.

For the purpose of simplifying the ensuing description, the sector-like area contained between adjacent contour lines 1 and having a fixed angular scope of 360 electrical degrees will be termed the "lane" as will the sector-like areas disposed between adjacent contour lines 2. Furthermore, since the navigational pattern is developed by a chain of three transmitters A, B and C, the pattern produced by the A and B transmissions will be termed the "red link", while that produced by the radiations from transmitters A and C will be termed the "green link". Furthermore, a motion or displacement of the vehicle 3 a distance sufficient to change the distance from the vehicle to a selected transmitter an amount equal to 1/360th of the wavelength of the fundamental of which all of the radiated signals are harmonics will be termed a "unit displacement." Similarly, a spacing between transmitters sufficient to require one millisecond for signals radiated from one of the transmitters to travel to the other transmitter will be termed a "unit spacing."

In the normal operation of a navigational system such as that disclosed in my aforementioned copending application, transmitters A, B and C are operated to radiate signals comprising the 6th, 8th and 9th harmonics, respectively, of any suitable fundamental frequency. For the purpose of explanation, there has been selected as an example a fundamental frequency of 10 kilocycles in accordance with which the transmitters A, B and C are operated at frequencies of 60, 80 and 90 kilocycles, respectively. The receiving apparatus which is disclosed in the aforementioned copending application operates to convert each of the 6th and 8th harmonic signals to a 24th harmonic having a frequency of 240 kilocycles in the assumed example and includes a phase indicator for measuring the phase angle between the resulting 24th harmonic signals. Similarly the 6th and 9th harmonic signals are each converted to the 18th harmonic having a frequency of 180 kilocycles in the assumed example, and a phase indicator is provided to measure and indicate the phase relation between the two 18th harmonic signals. These two phase indications give the relation between the location of the vehicle and any two adjacent contour lines 1 and any two adjacent contour lines 2.

In other words, the indication gives the geographical location of the vehicle within intersecting lanes in the red link and in the green link, but it does not identify which of the plurality of intersecting lanes are the correct lanes.

In order to identify the correct lanes, the transmitters A, B and C are from time to time subjected to an alternative mode of operation in accordance with the following schedule:

| | Trans. B—Red Link | —Trans. A— | Green Link—Trans. C |
|---|---|---|---|
| Normal | 80 kc. | 60 kc. | 90 kc. |
| First Mode | off | 60 and 70 kc. | 90 and 80 kc. |
| Second Mode | 80 and 90 kc. | 60 and 70 kc. | off |
| Normal | 80 kc. | 60 kc | 90 kc. |

In each of the modes of operation tabulated above a phase lock is maintained among all signals in a manner to be described hereinafter so that each of the radiated signals bears a fixed multiple phase relation to each of the other radiated signals.

If suitable receiving apparatus, such as that described hereinafter is moved within the operational field of the transmitting equipment, a unit displacement such as to change the distance from the receiver to a selected transmitter a distance equal to $1/360$th of the wave-length of the fundamental frequency, the phase angle change at the fundamental frequency would be equal to 1°. It may be seen that a unit displacement would produce a 9° phase change at 90 kilocycles, 8° phase change at 80 kilocycles and 6° change at 60 kilocycles. In other words, the phase difference resulting from a unit displacement is equal to the number of the harmonic of the signal concerned. Therefore, if the receiver is moved a unit displacement with respect to transmitter C and about transmitter A as a pivot, the 90 kilocycle signal would shift 9°, while the 60 kilocycle signal would remain unchanged.

Since the 90 kilocycle signal is doubled and the 60 kilocycle signal is trebled to produce the 180 kilocycle reference frequency at which the phase angle is measured, the respective phase changes are similarly multiplied so that the green link phase indicator would show a change of 18° resulting from a unit displacement of the receiver with respect to transmitter C and about transmitter A as a pivot. In a similar manner, it will be seen that a phase change of 24° will be indicated by the red link phase indicator resulting from a unit displacement of the receiver with respect to transmitter B and about transmitter A as a pivot.

As will be described hereinafter, the receiving equipment intended for use with the navigational system disclosed herein includes means for receiving 70 kilocycle signals in addition to the 60, 80 and 90 kilocycle signals and provides for heterodyning the 60 and 70 kilocycle signals to produce one 10 kilocycle output and means for heterodyning 80 and 90 kilocycle signals for producing a second 10 kilocycle output. A phase indicator is provided for measuring the phase relation between these two 10 kilocycle signals. It may be seen, therefore, that during the first mode of alternative transmitter operation, a unit displacement of the receiver with respect to transmitter C and about the transmitter A as a pivot will result in a 1° phase change in the indication given by the lane identification indicator which measures the phase of the two 10 kilocycle signals. Since this first mode of operation involves the operation of transmitters A and C only, the resulting indication is a coarse indication in the green link. Likewise the second mode of alternative transmitter operation results in a coarse indication in the red link amounting to a 1° phase change for a unit displacement of the receiver with respect to transmitter B and about transmitter A as a pivot.

From the foregoing explanation, it will be seen that the indication given by the comparison of the two 10 kilocycle heterodyne frequencies is twenty-four to one less sensitive in the red link and eighteen to one less sensitive in the green link than the indication given by the normal operation of the system and as read on the normal red and green link indicators. Therefore, if the position of the vehicle is known within twenty-four lanes of the red link and within eighteen lanes of the green link, the lane identification meter may be read with sufficient accuracy to determine which of the twenty-four red lanes and which of the eighteen green lanes define the geographical location of the vehicle. The position of the vehicle within the identified lanes, is of course, determined by reference to the normal red and green lane indicators.

Figure 2:
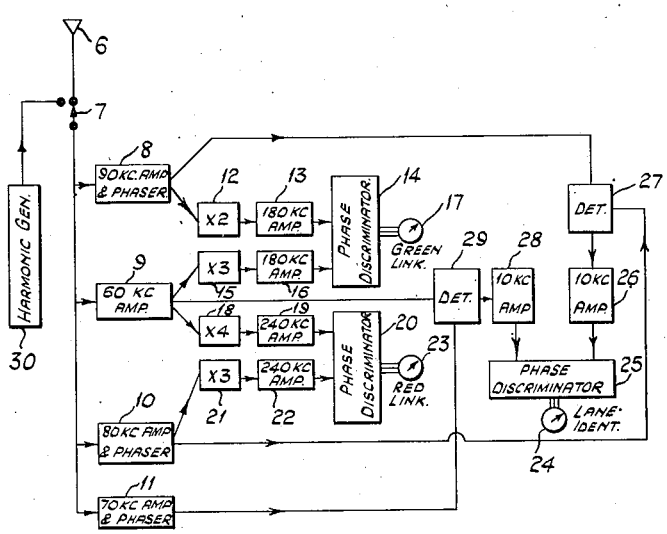
Fig. 2 is a block diagram illustrating a form of receiving apparatus which may be used with the disclosed navigational system and which includes means for giving a lane identification.

I have illustrated by means of a block diagram shown in Fig. 2 suitable receiving apparatus for receiving the signals transmitted from the A, B and C transmitters and for providing a lane identification of the character above described.

This equipment includes a suitable receiving antenna 6 which is coupled through a normally closed switch 7 to the input circuits of four radio frequency amplifiers 8, 9, 10 and 11 tuned to the 9th, 6th, 8th, and 7th harmonics, respectively. In the assumed example using a 10 kilocycle fundamental, the amplifiers are tuned to 90, 60, 80 and 70 kilocycles, respectively.

A portion of the output of the 90 kilocycle amplifier is applied to the input of a frequency doubler 12, the 180 kilocycle output of which is amplified by a suitable amplifier 13. The output of the amplifier 13 is coupled to one input of a phase discriminator 14. Similarly, a portion of the output of the 60 kilocycle amplifier 9 is applied to the input of a frequency trebling circuit 15, the 180 kilocycle output of which is amplified by a suitable 180 kilocycle amplifier 16. The output of the amplifier 16 is coupled to a second input circuit of the phase discriminator 14.

The phase discriminator 14 may be of any suitable type but is preferably constructed in accordance with the disclosure contained in my copending application, Serial No. 612,991 filed, August 27, 1945 and entitled Multiple channel radio frequency receiver, and which operates to produce two direct potentials, the ratio of which is equal to the tangent of the phase angle between the alternating potentials applied to the two input circuits of the discriminator. These output potentials are applied to the green link phase indicator represented at 17, which indicator may comprise a crossed coil instrument operating to cause a pointer to assume an angular position such that the tangent of such angle is equal to the ratio of the two direct potentials applied to the instrument. While any suitable instrument may be used, a preference is expressed for the phase indicating meter which is disclosed in my copending application Serial No. 612,984, filed August 27, 1945 and entitled "Registering goniometer."

Another portion of the output of the 60 kilocycle amplifier 9 is applied to a frequency quadrupling circuit 18, the 240 kilocycle output of which is applied to input of a suitable 240 kilocycle amplifier 19. The output of the amplifier 19 is applied to one input circuit of a second phase discriminator 20. A portion of the 80 kilocycle output signal from the amplifier 10 is applied to a frequency trebling circuit 21, the 240 kilocycle output of which is amplified by a suitable 240 kilocycle amplifier 22. The output of the amplifier 22 is applied to the other input circuit of the phase discriminator 20, which discriminator operates to indicate on a red link phase meter 23 the phase relation between the two 240 kilocycle signals applied to the phase discriminator 20. The equipment thus far described comprises the means for giving the normal red and green indication during the normal mode of transmitter operation.

The receiving equipment includes additionally a third phase indicating meter or lane identification meter 24 which is coupled to the output of a third phase discriminator 25. To one input circuit of the phase discriminator 25 there is applied a 10 kilocycle signal derived from a 10 kilocycle amplifier 26, the input of which is coupled to a detector circuit 27 within which a portion of the output from the amplifier 8 and a portion of the output from the amplifier 10 is mixed. The resulting heterodyning of the 80 and 90 kilocycle signals and the subsequent detection thereof applies a 10 kilocycle signal to the input of the amplifier 26. The second input circuit of the phase discriminator 25 receives a 10 kilocycle signal derived from a second 10 kilocycle amplifier 28, the input of which is coupled to a detector circuit 29 operating to mix 60 and 70 kilocycle signals derived from the output of the amplifiers 9 and 11, respectively.

For standardization purposes and for purposes of initial adjustment, manual phase shifting means are preferably included in the 90, 80 and 70 kilocycle amplifiers, respectively. In making the initial adjustment, the switch 7 is thrown to the alternate position to connect the input circuits of the amplifiers 8, 9, 10 and 11 to the output of a harmonic generator 30. The harmonic generator 30 is preferably constructed in accordance with the disclosure contained in my copending application Serial No. 612,988, filed August 27, 1945, and entitled "Signal generator" or it may comprise any suitable signal generator operating at a fundamental frequency of 10 kilocycles and producing a signal rich in the higher harmonics, which signals bear a fixed multiple phase relation to each other.

When the switch 7 is thrown to such alternate position, the readings of the phase indicators 17, 23 and 24 are set to zero by adjustment of the phase shifters in amplifiers 8, 10 and 11. Thereafter the operation of the receiving equipment may be checked at any time by throwing the switch 7 to check for zero reading. Any discrepancy indicates a phase shift within the receiving apparatus itself and may be corrected by appropriate adjustment of the phase shifters in the amplifiers 8, 10 and 11 to bring the meter readings to zero.

Figure 3:
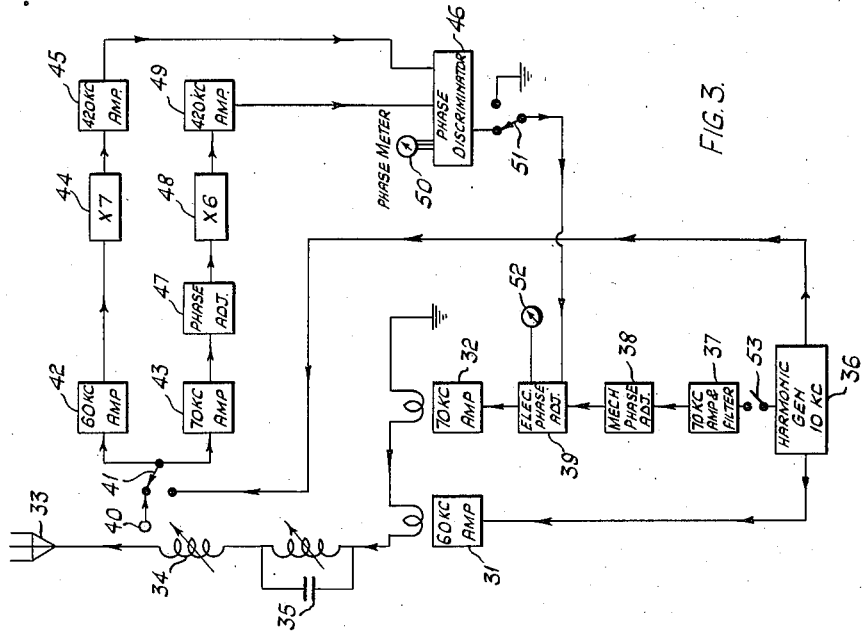
Fig. 3 is a block diagram illustrating the equipment comprising the master transmitter of the navigational system and indicating the mode of operation of such equipment.

I have illustrated in Fig. 3 the equipment comprising the master transmitter A and which operates to maintain the required fixed multiple phase relation between the radiated 60 and 70 kilocycle signals. The master transmitting equipment includes a 60 kilocycle power amplifier 31 and a 70 kilocycle power amplifier 32. These amplifiers are coupled as shown to an antenna circuit feeding a transmitting antenna 33 and including tuning components 34 and 35 serving, in effect, to tune the antenna 33 at 70 kilocycles and also at 60 kilocycles.

The 60 kilocycle amplifier 31 is driven from a harmonic generator 36 operating at a fundamental frequency of 10 kilocycles and producing a signal which is rich in the higher harmonics. The amplifier 31 selects the 6th harmonic and amplifies that 60 kilocycle signal. A portion of the output of the harmonic generator 36 is coupled to a 70 kilocycle amplifier and filter 37, the output of which is fed through a mechanical phase adjustor 38 and an electronic phase adjustor 39. The output of the phase shifter 39 is applied to the 70 kilocycle amplifier 32.

Near the antenna 33 there is placed a small pick-up loop 40 adapted to pick up the 60 and 70 kilocycle signals radiated from antenna 33. The loop is coupled through a normally closed switch 41 to the input circuits of a 60 kilocycle amplifier 42 and a 70 kilocycle amplifier 43. The output of the amplifier 42 is connected to a frequency multiplying circuit 44 operating to produce an output frequency seven times the input frequency. The resulting 420 kilocycle signal is applied to a 420 kilocycle amplifier 45, the output of which is coupled to one input circuit of a phase discriminator 46.

In a like manner, the 70 kilocycle output of the amplifier 43 is fed through a phase adjustor 47 and applied to the input circuit of a frequency multiplier 48 operating to produce an output frequency six times the input frequency. The resulting 420 kilocycles signal is amplified by a 420 kilocycle amplifier 49, the output of which is coupled to the other input circuit of the phase discriminator 46.

A phase meter 50 driven by the phase discriminator 46 is provided for visual observation of the multiple phase relation between the radiated 60 and 70 kilocycle signals and for the purpose of adjustment as will be described hereinafter. The phase discriminator 46 includes also a circuit for producing a direct potential which varies in magnitude in accordance with changes in the phase relation between the two 420 kilocycle signals applied to the input of the discriminator 46. This direct potential is applied through a normally closed switch 51 to the electronic phase adjustor 39. This adjustor is preferably of the variable reactance type which is disclosed in my copending application Serial No. 612,985, filed August 27, 1945 and entitled Radio frequency transmitting apparatus, and which operates to produce a phase shift between its input and output signals in opposition to the phase shifts in the 420 kilocycle inputs to the phase discriminator 46 resulting in changes in the direct control potential applied to the phase adjustor 39. Thus it will be seen that the apparatus operates as a regulator to maintain a constant multiple phase relation between the radiated 60 and 70 kilocycle signals. This regulated relation may be adjusted as desired through manipulation of the manual phase adjustor 47.

The electronic phase adjustor 39 preferably includes a plate milliammeter 52 which serves to indicate the degree of loading of the variable reactance tubes. The mechanical phase adjustor 38 may be adjusted by reference to the meter 52 to maintain the electronic phase adjustor 39 in the central region of its operating range.

In order that the master transmitter equipment may be operated in the normal fashion to radiate 60 kilocycle signals solely, I interpose between the harmonic generator 36 and the amplifier 37 a switch 53 which is closed only during the first and second alternative modes of transmitter operation. If desired, the switch may be connected with suitable time controlling apparatus so that its periodic closing and opening may be effected automatically.

Figure 4:
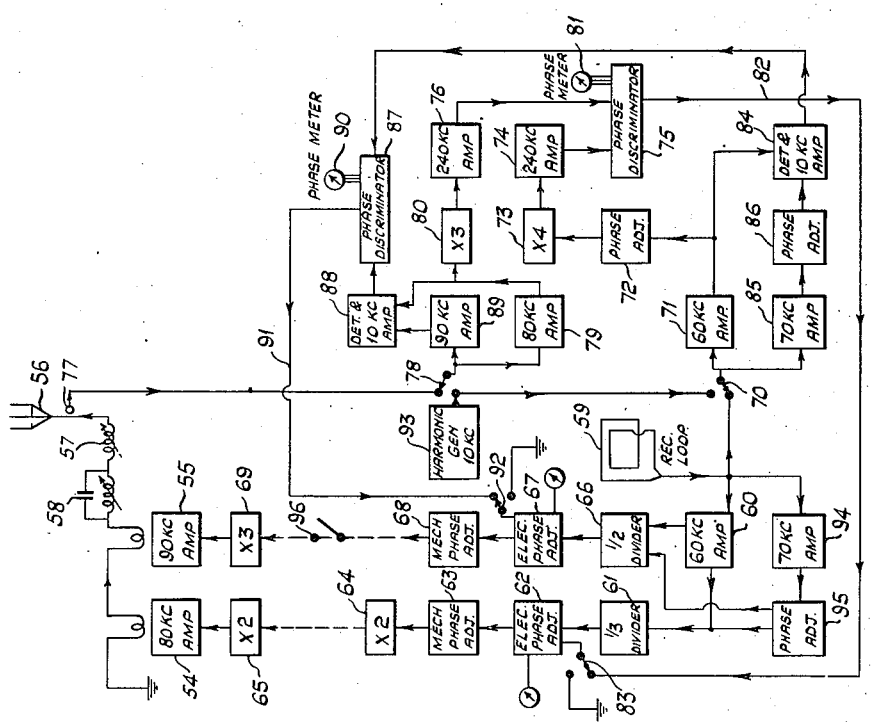
Fig. 4 is a block diagram illustrating the apparatus comprising one of the slave transmitters forming a part of the navigational system and indicating the mode of operation of such equipment.

I have illustrated in Fig. 4 the equipment comprising the red link slave transmitter B. Similar equipment is employed for the green link slave transmitter C. Since these transmitters are intended to radiate from their respective antennae both 80 and 90 kilocycle signals, the equipment includes an 80 kilocycle power amplifier 54 and a 90 kilocycle power amplifier 55. These amplifiers are coupled as shown to feed a transmitting antenna 56 through tuning components 57 and 58 operating, in effect, to tune the antenna 56 to a frequency of 80 kilocycles and also to a frequency of 90 kilocycles.

The amplifiers 54 and 55 are each excited from signals derived initially from transmitter A and picked up on a receiving loop antenna 59.

The ensuing brief and general description of the mode of operation of the slave drive equipment is intended to facilitate the understanding of the detailed description following. As will be described, both 60 and 70 kilocycle signals are received by the receiving loop 59. The 60 kilocycle signals are subjected to a frequency changing operation producing 80 and 90 kilocycle derived signals for the amplifiers 54 and 55. These phase signals are phase locked to each other and to the 60 kc. signal in the following manner:

Phase standardization of the 80 kilocycle transmitted signal is obtained by comparing the transmitted 80 kilocycle signal with the received 60 kilocycle signal and using the measured multiple phase relation between these signals to operate an electronic phase adjustor in the 80 kilocycle drive circuit. The received 70 kilocycle signals are heterodyned against the received 60 kilocycle signals to produce a 10 kilocycle beat note, the phase of which is compared with the phase of a 10 kilocycle signal resulting from the heterodyning of the transmitted 80 and 90 kilocycle signals. The phase comparison of the two 10 kilocycle beat notes produce a control potential which is applied to an electronic phase adjustor in the driving circuit for the 90 kilocycle amplifier. Thus the 80 kilocycle signal is regulated to bear a fixed multiple phase relation to the 60 kilocycle signal transmitted from the master transmitter A and the 90 kilocycle signal is regulated to bear a fixed multiple phase relation to the 70 kilocycle signal transmitted from the master transmitter A. Since the 60 and 70 kilocycle signals are phase locked in the apparatus of master transmitter A, a fixed multiple phase relation is thus caused to obtain between the transmitted 80 and 90 kilocycle signals.

The apparatus for obtaining the above described mode of operation may be described in detail as follows:

The receiving loop 59 is coupled to the input of a 60 kilocycle amplifier 60, a portion of the output of which is coupled to the input circuit of a frequency divider 61 operating to produce a 20 kilocycle output. This output is fed through an electronic phase adjustor 62 and a mechanical phase adjustor 63 to a frequency doubling circuit 64 operating to raise the frequency to 40 kilocycles. This 40 kilocycle output is applied to a frequency doubling circuit 65 serving to produce an 80 kilocycle output signal which is applied to the input of the 80 kilocycle power amplifier 54.

Another portion of the 60 kilocycle output of the amplifier 60 is applied to a frequency divider 66 serving to halve the frequency of the applied signals. The resulting 30 kilocycle output is fed through an electronic phase adjustor 67 and a mechanical phase adjustor 68 to a frequency trebling circuit 69 operating to produce a 90 kilocycle output signal. This 90 kilocycle signal is applied to the input of the 90 kilocycle power amplifier 55.

The receiving loop 59 serves also to feed 60 kilocycle signals received from transmitter A through a normally closed switch 70 to the input of a 60 kilocycle amplifier 71. The output of this amplifier is coupled through a manual phase adjustor 72 to the input of a frequency quadrupling circuit 73 operating to apply a 240 kilocycle signal to a 240 kilocycle amplifier 74. The output of the amplifier 74 is connected to one input circuit of a phase discriminator 75. The other input circuit of the phase discriminator 75 is coupled to the output of a second 240 kilocycle amplifier 76. This amplifier is excited by means of 80 kilocycle signals induced in a small pick-up loop 77 positioned near the slave transmitter antenna 56. Signals so picked up are connected through a normally closed switch 78 to the input of an 80 kilocycle amplifier 79, the output of which is coupled to a frequency trebling circuit 80 operating to raise the frequency to 240 kilocycles. It is the output of the trebling circuit 80 which is applied to the input of the amplifier 76.

The phase discriminator 75 operates to indicate on an associated phase meter 81 the multiple phase relation existing between the 60 kilocycle signals received from transmitter A and the 80 kilocycle signals radiated from antenna 56. The phase discriminator 75 also operates to produce a direct control potential which is fed as indicated at 82 through a normally closed switch 83 to the control circuit of the electronic phase adjustor 62. This connection serves to effect a phase correction in the 20 kilocycle signals derived from the divider 61, the correction being in such direction as to offset shifts in phase between the 80 kilocycle signals radiated from antenna 56 and 60 kilocycle signals received from transmitter A. Thus a fixed multiple phase relation is maintained between the 80 kilocycle signals transmitted by the slave transmitter B and the 60 kilocycle signals transmitted by the master transmitter A.

The phase regulation of the 90 kilocycle signals radiated from antenna 56 is obtained in the following manner. A portion of the output of the 60 kilocycle amplifier is connected to one input circuit of a mixer and detector 84. 70 kilocycle signals radiated by transmitter A and picked up by the receiving loop 59 are passed through the switch 70 and applied to the input of a 70 kilocycle amplifier 85. The output of this amplifier is passed through a manual phase adjustor 86 and applied to the other input circuit of the mixer and detector 84. The 60 and 70 kilocycle signals are combined and detected in the detector 84 to produce a 10 kilocycle beat note which is applied to one input circuit of a phase discriminator 87. The other input circuit of the phase discriminator 87 is coupled to the output of a detector and mixer 88 serving to produce a 10 kilocycle beat note resulting from the heterodyning of 80 kilocycle and 90 kilocycle signals fed thereto from the 80 kilocycle amplifier 79 and a 90 kilocycle amplifier 89, the input of which is connected to the pick-up loop 77 through the switch 78.

The phase discriminator 87 is used to drive a phase meter 90 serving to indicate the multiple phase relation between the two 10 kilocycle beat notes. The discriminator 87 also produces a direct control potential which is applied as indicated at 91 through a normally closed switch 92 to the electronic phase adjustor 67 in the 90 kilocycle channel.

It will be seen that since the multiple phase relation between the 60 and 70 kilocycle signals picked up by the receiving loop 59 is fixed by the phase lock equipment in the master transmitter and since the electronic phase adjustor operates to maintain a fixed multiple phase relation between the 60 kilocycle signals transmitted by transmitter A and the 80 kilocycle signals radiated from antenna 56, comparison of the phase relation between the two 10 kilocycle beat notes is a measure of the phase regulation required to maintain a fixed multiple phase relation between the radiated 90 kilocycle signals and the radiated 80 kilocycle signals. The electronic phase adjustor 67 operates in response to variations in the control potential produced by the discriminator 87 to adjust the phase of the signals exciting the 90 kilocycle amplifier 55 in such a way as to maintain a fixed multiple phase relation between the 80 and 90 kilocyle signals radiated from antenna 56.

In order to avoid the possible ambiguities resulting from improper synchronization of the dividers 61 and 66, a portion of the signal picked up by the receiving loop 59 is applied to the input of a 70 kilocycle amplifier 94, the output of which is coupled through a manual phase adjustor 95 to the input circuits, respectively, of the dividers 61 and 66. Since a fixed multiple phase relation is established by the equipment comprising transmitter A between the 60 and 70 kilocycle signals, it will be seen that proper synchronization of the divider circuits 61 and 66 obtains from injecting into each of the divider circuits a 70 kilocycle signal such as that produced at the output of the amplifier 94.

During the normal operation of the navigational system 80 kilocycle signals only are radiated from antenna 56. Such an operation is obtained by opening a switch 96 interposed in the circuit applying the driving signal to the input of the 90 kilocycle amplifier 55. The switch 96 may be arranged to be controlled in any suitable manner in synchronization with the switch 53 at the master transmitter A as, for example, by means of synchronized clock driving mechanisms.

The equipment comprising the green link slave transmitter C is similar to that just described as comprising the red link slave transmitter B. The controls for the 80 and 90 kilocycle signals are, however, reversed and phase control of the 90 kilocycle channel will be obtained by a phase discriminator operating to compare the 60 and 90 kilocycle signals at a common comparison frequency of 180 kilocycles.

The charts to be used with the navigation system are best prepared from calculated values and given an artibrary lane numbering. The transmission system must then be so operated as to maintain the projected pattern in alignment with such a chart. To accomplish this, the essential conditions are, first, that a fixed phase difference be maintained between the fourth harmonic of the 60 kc. transmission and the third harmonic of the 80 kc. transmission, and second, that a fixed phase difference be maintained between the beat note of the 60 and 70 kc. transmissions and the beat note of the 80 and 90 kc. transmissions. Both of these conditions may be met without a phase lock between the 60 and 70 kc. transmissions of the master; however, if a phase control is provided as shown in Fig. 3, there is more latitude in the design of the slave control particularly with respect to elimination of ambiguity arising from the frequency divider circuit. The slave control arrangement shown in Fig. 4 requires a reasonable phase lock between the transmitted 60 and 70 kc. master signals.

To make the initial adjustment of the pattern, transmission is first started at the master. The phase relation of the two signals is arbitrary but thereafter must be maintained. This may be accomplished by throwing the switch 41 to its reference position connecting the harmonic generator 36 in circuit and noting the reading of the phase meter 50. Thereafter periodic checks may be made and phase adjuster 47 manipulated if necessary to re-establish the noted reference reading. The slave transmitter is then switched on so as to radiate only the 80 kc. signal with the electronic phase control switched off. The signal fed into the phase adjuster 95 is alternately switched off and on and adjustment made such that no deflection is noticed on the phase meter 81 by the alternate switching.

The mechanical phase adjuster 63 is then set to give a zero reading on the phase meter 81 which is a setting which also gives zero electronic control voltage. The switch 83 from the electronic phase adjuster 62 is then thrown to the operational position.

The phase meter reading of a monitor receiver located at a known position is compared with that of the chart for the monitor location to determine the direction and magnitude of the phase shift required to give a correct reading at the monitor receiver. Switches 78 and 70 of the slave drive equipment are then thrown to the "reference position" and by adjustment of the phase adjuster 72, the required shift in phase is made. A note of the phase meter reading is made for future reference. The reference switches 78 and 70 are returned to the operational position and the mechanical phase adjuster 63 is set to give a normal current reading on the electronic phase adjuster 62. This series of operations should fix the normal operational pattern, although a second adjustment may be required to obtain the desired precision.

The lane identification pattern is set next in the following manner:

Switch 96 is closed to give a 90 kc. transmission and switch 92 is set to the non-operational position. The mechanical phase adjuster 68 is set to give a zero reading on phase meter 90 after which switch 92 is returned to the operational position.

The phase meter reading at the monitor location is compared with the chart value and the magnitude and direction of the required phase adjustment is determined. Switches 78 and 70 of the slave drive equipment are then thrown to the reference position and the required phase shift is applied through manipulation of phase adjuster 86, and the new reading of phase meter 90 is noted for future reference. The switches 78 and 70 are returned to their operating position and the mechanical phase adjuster 68 set to give normal reading on the meter connected to the electronic phase adjuster 67. This series of operations fixes the lane identification pattern.

As frequently as operating conditions may require, the switches may be turned to reference position and improper operation detected by noting a difference between the phase meter readings and the previously noted reference readings. The patterns may be realigned by so adjusting the phase adjusters as to re-establish the reference readings.

With the equipment above described, other alternative modes of transmitter operation may be used to provide different degrees of lane identification. For example, the transmitters may be operated in accordance with the following schedule:

| | Trans. B—Red Link—Trans. A—Green Link—Trans. C | | |
|---|---|---|---|
| Normal | 80 kc. | 60 kc. | 90 kc. |
| First Mode | off | 60 and 80 kc. | 90 and 70 kc. |
| Second Mode | 70 and 90 kc. | 60 and 80 kc. | off |
| Normal | 80 kc. | 60 kc. | 90 kc. |

As before, the pivotal unit displacement of a receiver with respect to transmitter B or C and about transmitter A will produce a 24° phase shift in the red link and an 18° phase shift in the green link. During the first mode of alternative operation, the phase shift of the 60 and 80 kilocycle signals will be zero, that of the 70 kilocycle will be 7° and that of the 90 kilocycle signal will be 9°. The heterodyning of the 70 and 60 kilocycle signals will result in a phase shift of 7° in the 10 kilocycle beat note. Similarly, the 10 kilocycle beat note resulting from the heterodyning of the 80 and 90 kilocycle signals will be shifted 9°. The difference in phase shift as indicated by the lane identification phase meter 24 will be 2°. Thus there will result an indication on the lane identification meter in the green lane which is nine to one less sensitive than the normal operation and an indication in the red link which is twelve to one less sensitive than is given by the normal operation of the apparatus. While the identification given is not as comprehensive as in the previously described mode of operation, this modification is preferable where the transmitters A, B and C are relatively closely spaced so as to produce from twenty-five to fifty red and green lanes. The operator or navigator of a vehicle can ordinarily determine within reason his geographical location by dead-reckoning and for reasons of allowable tolerance in phase readings for a given accuracy of position, it is desirable to employ the least amount of identification which will meet the needs of a particular navigational problem.

It is to be noted also that during the first and second alternative modes of transmitter operation in the first described embodiment of my invention and also in the embodiment just described, the normal red and green link phase indicators 23 and 17 are operative. However, they are both operated on the green link during the first mode of alternative transmitter operation and both operated on the red link in the second alternative mode of transmitter operation. Since these meters are driven by the phase discriminators 14 and 20 operating at frequencies of 180 and 240 kilocycles, respectively, it is seen that the ratio of sensitivity of indication of the two meters is three to four. Therefore, a reading of the difference between the two meters 17 and 23 can be used to identify one lane in three for the green pattern and one lane in a group of four for the red pattern. This may be used as a check on the indication given by the lane identification meter 24.

In the embodiment of my invention just described, the signals radiated by transmitter A comprise 60 and 80 kilocycle signals. For such apparatus transmitting equipment shown in Fig. 3 may be used, but the amplifiers 32, 37 and 43 would be tuned to 80 kilocycles, the frequency multipliers 44 and 48 would embody multiplication ratios of four and three, respectively, and the amplifiers 45 and 49 would be tuned to 240 kilocycles. Similar alterations would be required of the slave drive equipment shown in Fig. 4.

From the foregoing it will be observed that I have provided a radio frequency navigational system operating to produce equi-phase radio field patterns defining an intersecting hyperbolic coordinate system which may be used to control the navigation of mobile vehicles and to indicate continuously the geographical locations of vehicles equipped with appropriate receiving apparatus.

It will also be noted that during the periods of alternative transmitter operation, the lane indicating meter serves to give a coarse indication of the vehicle's position and by so doing serves to indicate that one of a plurality of possible lanes which correctly defines the geographical location of the vehicle.

Attention is directed particularly to the fact that this indication is given automatically through the proper control and operation of the transmitting equipment so that no control functions or operations need be performed by the pilot, driver or operator of the vehicle.

Attention is also directed to the fact that the complete operation of the system as a navigation system and for lane identification in both of the co-ordinate patterns is defined through operating the transmitting equipment at no more than four different radio frequencies.

While I have shown and described the preferred embodiment of my invention, I do not desire to be limited to any of the details of construction shown or described herein, except as defined in the appended claims.

I claim:

1. In a radio frequency navigational system, the combination of: means for radiating from one point radio frequency signals of given frequency; means for simultaneously radiating from a pair of points spaced from each other and spaced from said one point radio frequency signals of different frequencies, each different than said given frequency but harmonically related thereto; means for maintaining among said signals a fixed multiple phase relationship; means for periodically arresting radiation from one of said pair of points; means for simultaneously radiating from the other of said pair of points two radio frequency signals having said different frequencies; means for simultaneously radiating from said one point two radio frequency signals, one having said given frequency and the other having a frequency differing from said given frequency by the same amount as the difference between said signals of different frequency; and means for maintaining among all of said radiations a fixed multiple phase relationship.

2. In a radio frequency navigational system for normally providing a precise position indication and including means for radiating from one point radio frequency signals of given frequency, means for simultaneously radiating from a pair of points spaced from each other and spaced from said one point radio requency signals of different frequencies each different from said given frequency but harmonically related thereto, and means for maintaining among said signals a fixed multiple phase relationship, an apparatus for providing periodically a coarse position indication comprising: means for arresting radiation from one of said pair of points; means for simultaneously radiating from the other of said pair of points two radio frequency signals having said different frequencies; means for simultaneously radiating from said one point two radio frequency signals, one having said given frequency and the other having a frequency differing from said given frequency by the same amount as the difference between said signals of different frequency; and means for maintaining among all of said radiations a fixed multiple phase relationship.

3. In a radio frequency navigational system, the combination of: means for radiating from one point radio frequency signals of given frequency; means for simultaneously radiating from a pair of points spaced from each other and spaced from said one point radio frequency signals of different frequencies, each different than said given frequency but harmonically related thereto; means for maintaining among said signals a fixed multiple phase relationship; means for periodically arresting radiation from one of said pair of points; means for simultaneously radiating from the other of said pair of points two radio frequency signals having said different frequencies; means for simultaneously radiating from said one point two radio frequency signals, one having said given frequency and the other having a frequency differing from said given frequency by the same amount as the difference between said signals of different frequency; means for maintaining among all of said radiations a fixed multiple phase relationship; means for subsequently arresting radiation from the other of said pair of points; and means for simultaneously radiating from said one of said pair of points two radio frequency signals having said different frequencies.

4. In a radio frequency receiver for use with a radio frequency navigational system operating to normally radiate three signals of different but harmonically related frequencies bearing a fixed multiple phase relation to each other and periodically operating to radiate two pair of signals consisting of said three signals and a fourth signal, the signals of each pair having the same frequency difference as exists between two of said three signals, the combinaton of: means for simultaneously receiving said four signals; frequency change means for bringing two of said three signals to a first reference frequency; another frequency change means for bringing a different two of said three signals to a second reference frequency; phase indicating means for measuring and indicating the phase relationships of each of said reference frequencies; means for heterodyning each of said pairs of signals to produce two beat notes of like frequency; and means for measuring and indicating the phase relation between said beat notes.

5. In a radio frequency receiver for use with a radio frequency navigational system operating to normally radiate three signals of different but harmonically related frequencies bearing a fixed multiple phase relation to each other and periodically operating to radiate two pairs of signals consisting of said three signals and a fourth signal, the signals of each pair having the same frequency difference as exists between two of said three signals, and including means for receiving said signals and indicating the multiple phase relation among said three signals, the combination of: means for heterodyning each of said pairs of signals to produce two beat notes of like frequency; and means for measuring and indicating the phase relation between said beat notes.

6. In a radio frequency navigational system, the combination of: means for radiating from three spaced points three radio frequency signals, one from each of said points, said three signals being of three different frequencies; means for periodically arresting radiation from one of said points; means for radiating from the other two of said points two pairs of signals, one pair from each of said other two points, consisting of said three signals and a fourth signal, said signals each being a different harmonic of a given fundamental frequency, the numbers thereof comprising a uniform series of constant difference; and means for maintaining among all of said signals a fixed multiple phase relation.

7. In a radio frequency navigational system, the combination of: means for radiating from three spaced points three radio frequency signals one from each of said points, said three signals being of three different frequencies; means for periodically arresting radiation from one of said points; and means for radiating from the other two of said points two pair of signals one pair from each of the other two of said points, consisting of said three signals and a fourth signal, said signals each being a different harmonic of a given fundamental frequency, the numbers thereof comprising a uniform series of unit difference.

8. In a radio frequency navigational system, the combination of: means for radiating from two spaced points two pairs of radio frequency signals, one pair from each of said points, said signals each being a different harmonic of a given fundamental frequency and bearing a fixed multiple phase relation to each other; means for simultaneously receiving all of said signals; frequency change means for changing the frequencies of one signal from each of said points to provide a pair of equal frequency signals; phase indicating means for measuring and indicating the phase relation between said equal frequency signals; means for heterodyning each of said pairs of signals to produce two beat notes; means for deriving from said beat notes a pair of reference signals of like frequency less than the frequency of any of said radiated signals; and another phase indicating means for measuring and indicating the phase relation between said reference signals.

9. The method of aiding the navigation of a mobile vehicle which consists in radiating from two spaced points two pairs of radio frequency signals, one pair from each of said points, said signals each being a different harmonic of a given fundamental frequency and bearing a fixed multiple phase relation to each other, simultaneously receiving all of said signals on said mobile vehicle, changing the frequencies of a pair of received signals comprising one signal from each of said points to provide a first pair of reference signals of like frequency, measuring a first phase relation between said first pair of reference signals to determine a line of position through the location of said vehicle based upon a first equi-phase pattern, changing the frequencies of another pair of received signals comprising another signal from each of said points to provide a second pair of reference signals of like frequency, measuring a second phase relation between said second pair of reference signals to determine said line of position on the basis of a second equi-phase pattern, and measuring the difference between said first and second phase relations to determine said line of position on the basis of a third equi-signal pattern having a sensitivity less than that of said first and second patterns.

WILLIAM J. O'BRIEN.

REFERENCES CITED

The following references are of record in the file of this patent:

UNITED STATES PATENTS

| Number | Name | Date |
|---|---|---|
| 1,750,668 | Green | Mar. 18, 1930 |
| 2,144,203 | Shanklin | Jan. 17, 1939 |
| 2,405,238 | Seeley | Aug. 6, 1946 |
| 2,407,287 | Labin | Sept. 10, 1946 |
| 2,408,773 | Godall | Oct. 8, 1946 |
| 2,422,100 | Huff | June 10, 1947 |

OTHER REFERENCES

Ser. No. 429,583, H. De France (A. P. C.), published June 15, 1943.